United States Patent [19]

Kurokawa et al.

[11] 3,919,641

[45] Nov. 11, 1975

[54] DATA TRANSMISSION UTILIZING MODULATION OF ALTERNATE CARRIER CYCLES

[75] Inventors: Akira Kurokawa, Kawasaki; Tadashi Kojima, Yokosuka, both of Japan

[73] Assignee: Tokyo Shibaura Electric Co., Ltd., Kawasaki, Japan

[22] Filed: May 21, 1974

[21] Appl. No.: 471,982

[30] Foreign Application Priority Data

May 28, 1973 Japan ............................... 48-58567

[52] U.S. Cl. .............. 325/38 R; 178/66 R; 332/9 R

[51] Int. Cl.$^2$ ............................................ H04B 1/00

[58] Field of Search ....................... 178/66 R, 67, 68; 340/167 R, 171 R, 169, 172; 325/38 R, 62; 332/9 R, 11 R

[56] References Cited

UNITED STATES PATENTS 3,745,530 7/1973 Carman .......................... 340/171 R 3,779,321 12/1973 Landwer et al. ...................... 178/68

*Primary Examiner*—George H. Libman

*Attorney, Agent, or Firm*—Oblon, Fisher, Spivak, McClelland & Maier

[57] ABSTRACT

The system of the present invention comprises means for conducting amplitude modulation of a carrier wave of sine or quasi-sine waveform in the manner in which the carrier wave is defined into a plurality of blocks and all the cycles but one at least within each block are subjected to amplitude modulation by a digital data signal; and demodulating means for reproducing the digital data signal from the modulated carrier wave by the output of a comparator for comparing the amplitude of the amplitude-modulated cycle within each block with a reference level in the same block, that is, the amplitude of the amplitude-in-modulated cycle.

5 Claims, 12 Drawing Figures

2CLOCK-1BIT MODULATION

3CLOCK-2BITS MODULATION

3CLOCK-1BIT MODULATION

2CLOCK-2BITS MODULATION

DATA TRANSMISSION UTILIZING MODULATION OF ALTERNATE CARRIER CYCLES

This invention generally relates to a modulating-and-demodulating system for transmitting a digital data signal and particularly to a modulating-and-demodulating system and its device which are suitable for recording and reproducing a digital data signal by a magnetic recording and reproducing device which records an analog signal, such as an audio or video signal.

The conventional system for automatically operating a dimmer and other apparatus has been widely used in television studios, theaters, halls, etc. It is not infrequent that the automatic control of various apparatus, such as a dimmer, in synchronism with musical, sound, or image variation reproduced by a magnetic recording and reproducing device is necessary.

In compiling a program by a magnetic tape, it is often convenient to store on the tape a data signal representing a position of recorded information such as time, together with an information signal. When a digital data signal is recorded on the magnetic tape, a magnetic saturation recording system has been generally used as in a magnetic tape recorder of an electronic computer.

There are, however, the serious drawbacks in that the data recording-reproducing devices according to such a recording system are generally expensive and that is it impossible to record analog information, such as sounds or images, together with digital data on the same magnetic tape. On the other hand, the aforementioned magnetic saturation recording system can not be applied to the magnetic recording and reproducing device for recording and reproducing audio or video signals. It is, therefore, impossible to directly record a digital information signal together with an analog signal on the same magnetic tape as described above. Therefore, it follows that a high frequency carrier wave should be modulated by the digital data to record the modulated carrier wave on the magnetic tape. In such a case, frequency-, phase-, or amplitude-modulation systems are available for the purpose. However, these modulating systems have the serious disadvantages in that the former two become complicated and expensive in the modulating or demodulating circuits while the latter causes errors in the reproduced data in a transmission system having a wide level variation as in the magnetic recording and reproducing device.

Accordingly, an object of this invention is to provide a modulating-and-demodulating system and its apparatus capable of modulating and demodulating in a simple means when recording digital data signals by a magnetic recording and reproducing device for audio or video signals.

Another object of the invention is to provide a modulating and demodulating apparatus suitable for recording digital data signals on the record mediums other than the magnetic recording and reproducing device or transmitting the digital data signals on a transmission line having comparatively poor transmission characteristics.

This invention uses a signal of sine or quasi-sine waveform having substantially the same frequency and amplitude as a carrier wave modulated by a digital data signal.

The quasi-sine waves defined here may be not only cosine wave but also somewhat deformed sine wave (though not in its strict sense) having a constant amplitude and varying periodically from one polarity to the other polarity.

This carrier wave is defined into a plurality of groups, each group containing a given number of cycles. One "group" is referred to one "block" in the present invention. Several blocks are in correspondence with one word of digital data to be transmitted. For example, a carrier wave is defined into blocks at every two cycles. One cycle of a sine wave belonging to a block is assigned for a reference level signal, and the other is assigned for digital information to be transmitted. For example, when a four-bit digital information is transmitted, the sine wave of the one cycle contained in each of the four blocks is subjected to amplitude modulation by respective one bit of the digital information so that the amplitude of each cycle to be modulated takes one of two different levels. Each of these two different amplitude levels corresponds to 1 or 0 in the binary notation. For example, one of the levels is of the same level as the carrier amplitude (also a reference level) and the other level is of the lower or zero level. The demodulation of the carrier so modulated is conducted in the manner in which the amplitude of a modulated cycle is compared with the reference level in the same block to decide which of the 1 and 0 of binary information the modulated cycle contains. Such a modulating and demodulating system consists of a simple means for amplitude-modulating a sine wave signal to take one of the two levels constituting binary signals and an easy means for demodulating by comparing the amplitude of each cycle containing the digital information with the reference level. Thus the device becomes extremely simple. The demodulation can thus be effected by such comparison with sufficient accuracy even when there is a level variation in the transmitting or reproducing means. Each block may contain digital information consisting of a plurality of bits, and in that case a similar effect can be expected of it.

According to an embodiment of this invention, a sine wave or a quasi-sine wave can be used as a carrier. This carrier can be defined into a plurality of blocks by shaping the waveform of the carrier to obtain a first square wave and by further obtaining a plurality of second squre wave by frequency dividing the first square wave by a flip-flop circuit and a ring counter. Some cycles of the carrier wave within each block are modulated by a digital data signal. This can be done by a logical circuit supplied with the bits constituting the digital data signal and the second square waves, and by means for modulating the amplitude of a cycle within the block to be modulated by the output of this logical circuit, such as voltage-dividing means. A suitable head signal is added ahead of a group of blocks which ar e modulated by a plurality of bits constituting a digital data.

A demodulating means embodying the invention comprises a circuit for generating a clock pulse in synchronism with zero cross position of a modulated carrier wave, a circuit for forming a reference signal having a reference level from the amplitude of an amplitude-unmodulated cycle, a circuit for comparing the amplitude of an amplitude-modulated cycle within a block with the level of the reference signal in the same block, and a shift register supplied with the output of the comparator and the clock pulse.

According to the invention, a digital data signal is reproduced by comparing the amplitude of an amplitude-modulated cycle with the level of the reference signal formed of an amplitude-unmodulated cycle within the same block. Therefore, the digital data signal can be reproduced without errors even from the modulated wave transmitted through a transmission passage having a wide level variation.

According to this invention the modulated carrier wave can be recorded by a general-purpose tape recorder for acoustic recording. This modulated wave can also be transmitted on a telephone line by using an acoustic coupler. Phototransmission can also be effected by adapting a light-emitting diode or phototransistor. Since a high-frequency carrier wave can be modulated by the modulated carrier wave, the transmission can further be effected by modulating by the above-mentioned modulated carrier wave the unused band of subcarrier wave contained in a frequency modulated broadcasting signal. The carrier wave being modulated by the digital data signal may be a clock pulse of a quasi-sine wave as well as of a sine wave.

This invention can be more fully understood from the following detained description when taken in conjunction with the accompanying drawings, in which.

Figure 1A:
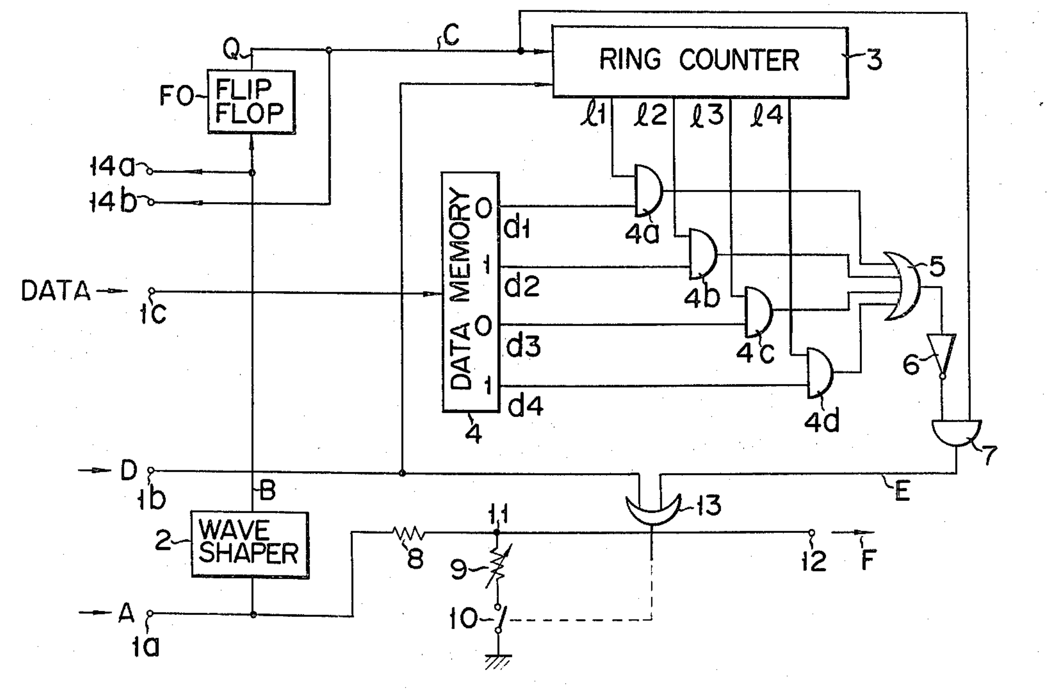
FIG. 1A shows a modulating circuit of an embodiment according to this invention for modulating a carrier wave by a digital data signal.
Figure 1B:
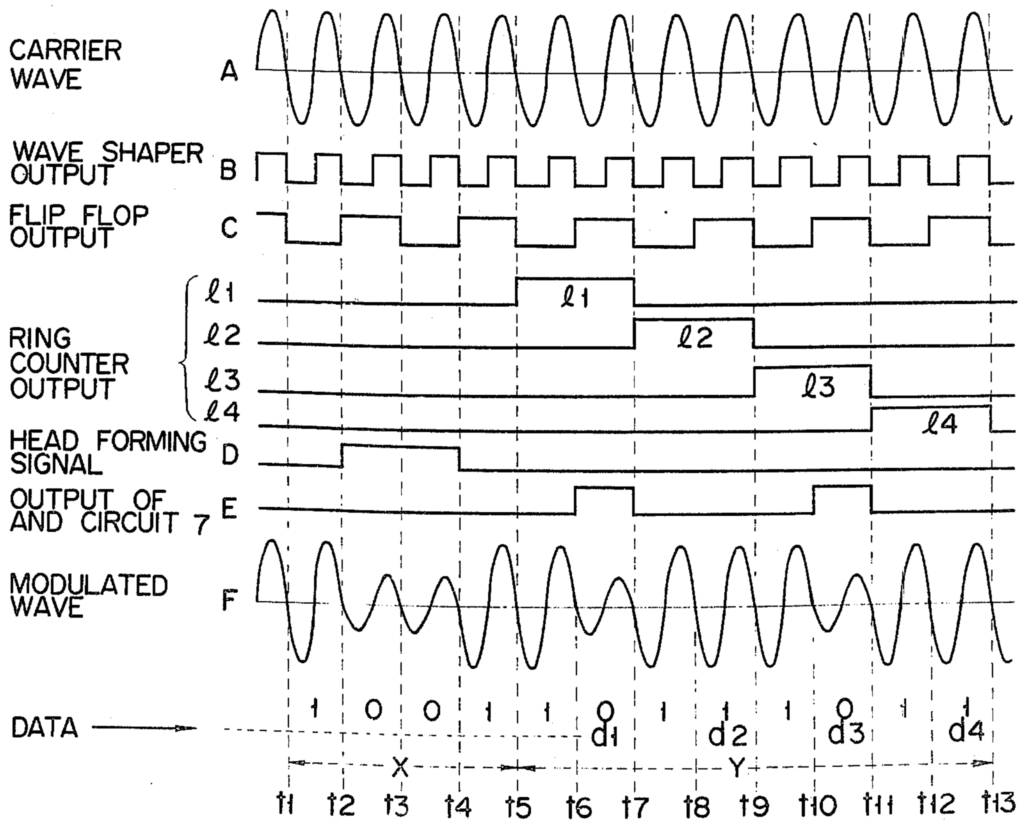
FIG. 1B illustrates various waveforms in the modulating circuit shown in FIG. 1A.
Figure 2A:
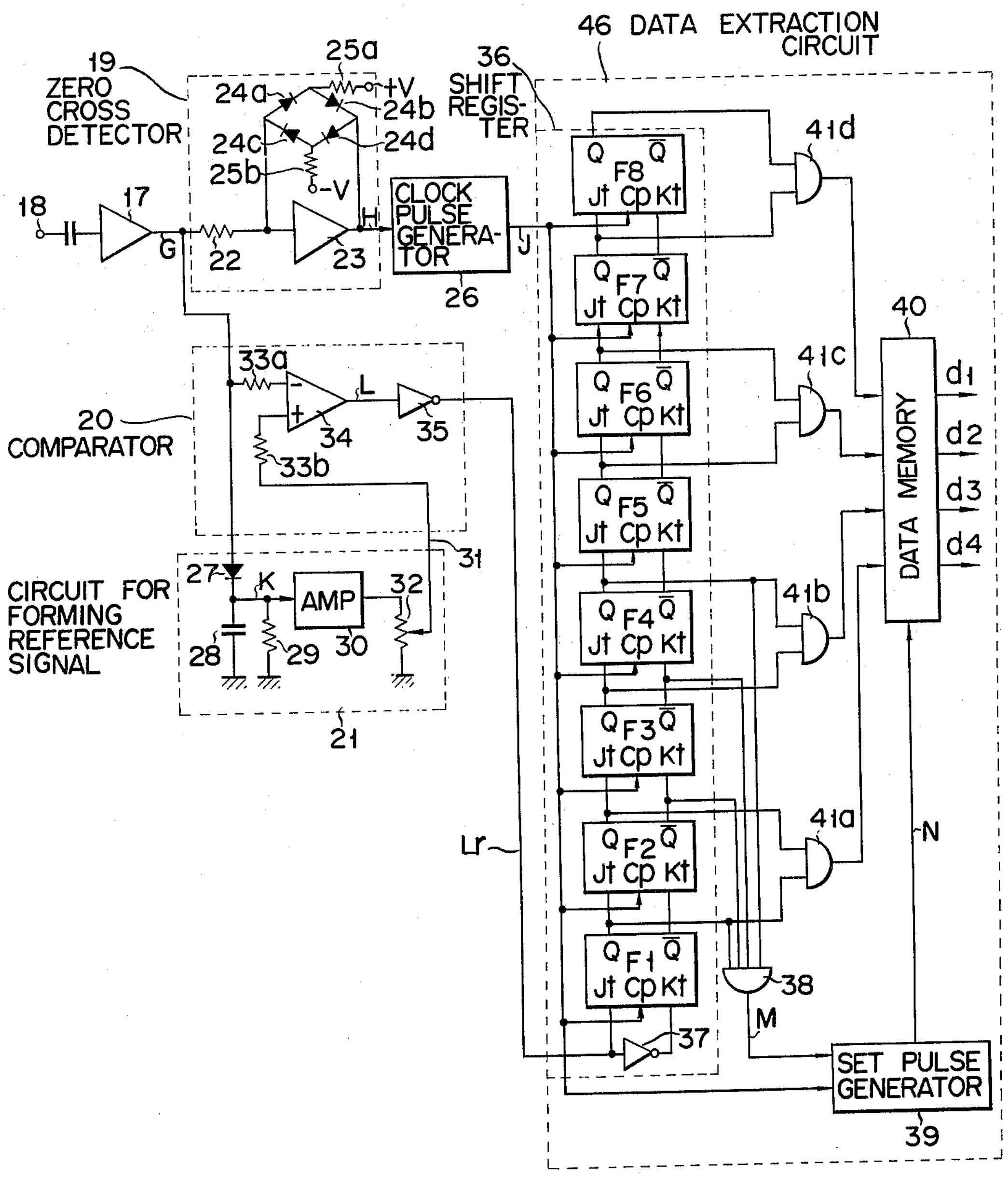
FIG. 2A represents a demodulating circuit of an embodiment according to the invention for reproducing a digital data signal from the modulated carrier wave shown in FIG. 1B.
Figure 2B:
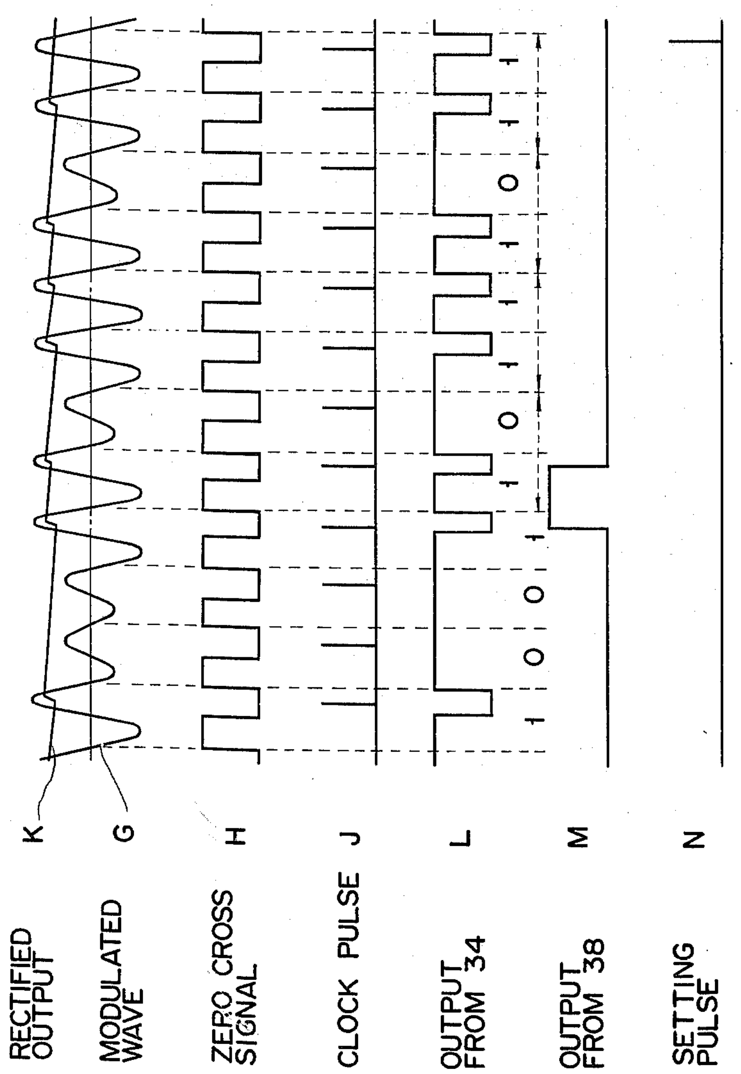
Figure 3A:
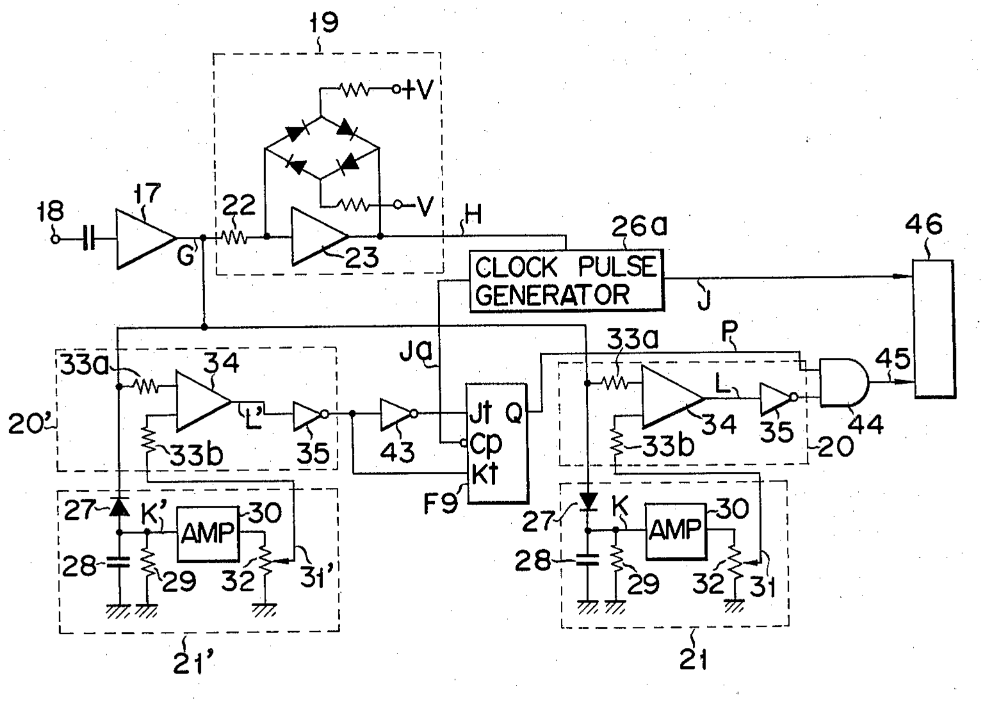
Figure 3B:
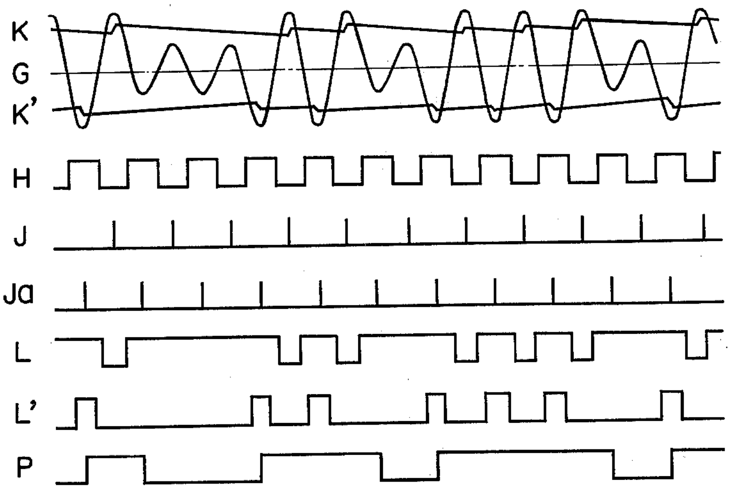
Figure 4A:
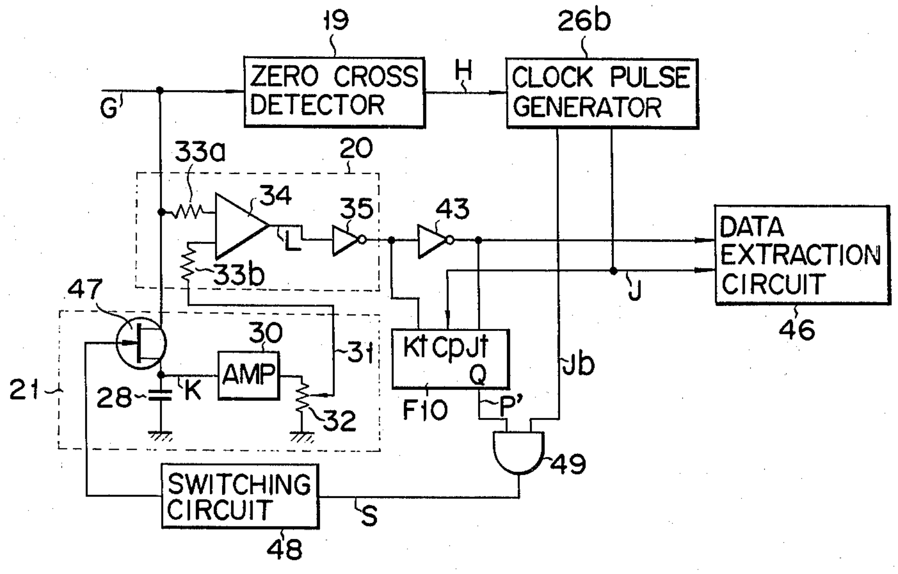
Figure 4B:
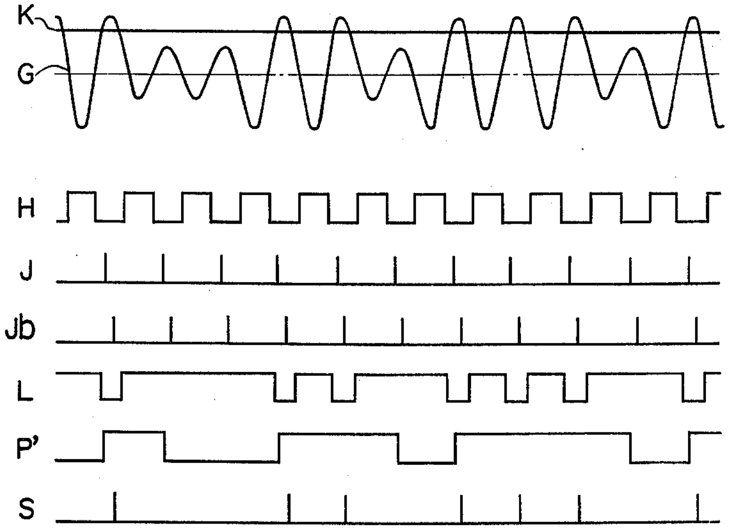

FIG. 2B indicates various waveforms in the demodulating circuit shown in FIG. 2A;

FIG. 3A illustrates another embodiment of the demodulating circuit according to the invention for reproducing a digital data signal from the modulated wave shown in FIG. 1B without being affected by noise;

FIG. 3B represents various waveforms in the demodulating circuit shown in FIG. 3A;

FIG. 4A illustrates still another demodulating circuit according to the invention;

FIG. 4B represents various waveforms in the demodulating circuit shown in FIG. 4A; and FIGS. 5A–5D illustrates various waveforms of the modulated wave according to the invention.

FIG. 1A is a circuit diagram for modulating a carrier wave consisting of a clock pulse having sine wave formed by a head-forming signal and a digital data signal containing 4 bits and for recording the modulated wave on a magnetic tape. The head-forming signal is supplied so as to modulate the carrier by digital information 1001. The portion modulated by the digital information 1001 is followed by the portion modulated by the digital data signal. Each digital data signal is defined to contain one word. In this embodiment, 12 cycles, including the head signal, are assigned to the one word. The digital data signal to be transmitted in this embodiment consists of four bits. A reference level signal is assigned to each bit. Throughout FIGS. 1A and 1B, the same reference numerals designate the same parts in the waveforms.

In FIGS. 1A and 1B, the carrier wave A or a sine-wave clock signal is fed from a carrier generator (not shown) to an input terminal 1*a*. The carrier wave A is shaped into a square wave B by a wave shaper 2. The square wave B is further converted into a square wave C that is frequency halved by a flip-flop circuit F0. The square wave C is supplied to a four-bit ring counter 3. The head-forming signal, such as a signal D which modulates the carrier by a digital signal 1001 is delivered to an input terminal 1*b* and also to the ring counter 3. The ring counter 3 sequentially carries square waves $l_1$–$l_4$ to its output terminals by the supply of the signal D. The carrier wave A is defined by these square waves into four blocks each containing one cycle for the transmission of the digital data signal and another one cycle for use of a reference level signal, totaling two cycles.

In addition, a four-bit data memory 4 is provided to be fed from an input terminal 1*c*, a digital data signal for modulating the carrier. The digital data signal is to be transmitted or recorded. The digital data signal in this embodiment consists of four bits, i.e., 0101. For general expression, however, the data signal is considered to be consisted of four bits of $d_1$, $d_2$, $d_3$ and $d_4$ in this embodiment. The outputs $d_1$ to $d_4$ from the data memory 4 are fed to AND circuits 4*a* to 4*d*, where one input is thereto and the other input is to the outputs $l_1$ to $l_4$ of the ring counter. The outputs of the AND circuits are fed as the inputs to an OR circuit 5 and the output therefrom is supplied as one input to an AND circuit 7 through an inverter 6. The output C from the terminal Q of the flip-flop circuit $F_0$ is fed as the other input to the AND circuit 7.

The carrier wave A fed from the input terminal 1*a* is grounded through a resistor 8, a variable resistor 9, and a switch 10. When the switch 10 is closed, the carrier wave A is voltage divided by the resistors 8 and 9, delivering the output F at a voltage division point 11 from an output terminal 12. The output E from the AND circuit 7 is fed to an OR circuit 13 as one input, while the head forming signal D is supplied to the OR circuit 13 as the other input. When there is an output from the OR circuit 13, the switch 10 will be closed. The input and output of the flip-flop circuit $F_0$ are led out as external synchronizing signals through terminals 14*a* and 14*b*. This signal is, for example, available for the synchronous supply of a digital signal and a head-forming signal.

The operation of the circuit of FIG. 1A will now be described in greater detail. Assume that $X(t_1–t_5)$ in FIG. 1B designates the period of modulating the carrier wave by the head signal 1001 and that $Y(t_5–t_{13})$ in FIG. 1B denotes the modulation period of the carrier wave A by the digital signal 0101. Immediately after the supply of the head signal D, the digital data signal 0101 is stored in the data memory 4. How the carrier wave A is modulated at each time will now be described below. For a period of time X, there will be an output from the OR circuit 13 only when the head forming signal D is fed, thereby closing the switch, subjecting the carrier wave A to voltage division or amplitude modulation. The output waveform F for a period of time $t_1$–$t_5$ is as shown. If 1 designates the amplitude-unmodulated cycle and 0 designates the amplitude-modulated cycle, then the modulated cycle during the period X will contain a head signal 1001.

The modulation of the carrier wave for a period of time Y will now be described. The carrier wave A will be defined into blocks $(t_5–t_7)$, $(t_7–t_9)$, $(t_9–t_{11})$ and $(t_{11}–t_{13})$ equivalent to the square wave widths $l_1$–$l_4$, respectively. Since $l_1 = 1, d_1 = 0$ for a period of time $t_5$–$t_6$, the outputs from the AND circuit 4*a* and OR circuit 5 will become 0. Since the output from the inverter 6 becomes 1, and the output from the flip-flop circuit F0 is 0, the outputs from the AND circuit 7 and OR circuit 13 will be 0. Therefore, the carrier wave A will not be modulated. During the next period of time between $t_6$ and $t_7$, since the output from the inverter 6 will remain to be 1 and the output C from the flip-flop circuit $F_0$ will become 1, the outputs from the AND circuit 7 and OR circuit 13 will become 1, thus turning the switch 10 ON and subjecting carrier to amplitude modulation. Therefore, the modulated wave for the period of time $t_5$–$t_7$ will contain an information signal $d_1$ or 0.

Since $l_2 = 1$ and $d_2 = 1$ in the subsequent period between $t_7$ and $t_8$, the outputs from the OR circuit 5 and inverter 6 are 1 and 0, respectively. And the signal C represents 0. Consequently the outputs from the AND circuit 7 and OR circuit 13 will become 0, thus subjecting the carrier wave to no amplitude modulation. For a period of time $t_8$–$t_9$, $l_2$ is 1, $d_2$ is 1, and the outputs from the AND circuit 4*b* and OR circuit 5 will become 1, but the output from the inverter 6 is 0. Therefore the outputs of the AND circuit 7 and OR circuit 13 will become 0, subjecting the carrier wave to no amplitude modulation. This means that the modulated wave during the period of time ($t_7$–$t_9$) contains the signal $d_2$, that is, information 1.

Similarly, the period of time ($t_9$–$t_{11}$) will contain the signal $d_3$, or information 0, whereas the period of time ($t_{11}$–$t_{13}$) will contain the signal $d_4$, that is, information 1.

When the modulation of the carrier wave A for a period of time (X + Y) is completed, the head forming signal D will be fed again and all the bits in the data memory 4 will be cleared and new bits will be stored. The ring counter 3 will thus be actuated by the head forming signal. The carrier wave is successively amplitude modulated by the head signal D and the newly stored data.

In the data memory 4, a new bit may be stored at the time when a bit already stored has been read out separated from the supply of the head forming signal without simultaneously storing four bits in synchronism with the delivery of the head forming signal. The carrier wave so modulated will be transmitted or magnetically recorded.

Referring now to FIGS. 2A and 2B, the reproduction of the digital from the modulated wave F thus transmitted or recorded and reproduced will be explained as an example. In FIG. 2A, the parts corresponding to the waveforms shown in FIG. 2B are designated by the same reference numerals. An amplifier 17 produces an amplified output G by being fed to its input terminal 18 and the modulated wave which is transmitted or reproduced from the magnetic recorder. The output G is supplied to a zero cross detector 19, a comparator 20, and a reference signal forming circuit 21. The zero cross detector 19 is a circuit for detecting only the zero point position information of the input signal G. It consists of a resistor 22, an amplifier 23 directly connected thereto, four diodes 24*a*–24*d* of the polarity shown and coupled between the input and output terminals of the amplifier 23, and resistors 25*a* and 25*b* applying a positive voltage to a node between the diodes 24*a* and 24*b* and impressing a negative voltage upon a node between the diodes 24*c* and 24*d*. The output H of the zero cross detector shown in FIG. 2B is fed to a clock pulse generator 26 from which a clock pulse J is generated.

The reference signal forming circuit 21 includes a diode 27 of the polarity shown, a capacitor 28 connected between its cathode and ground, a resistor 29 coupled in parallel to the capacitor 28, a high input impedance amplifier 30 for amplifying the voltage at a node between the diode 27 and the capacitor 28, that is, the rectified output K of the signal G, and a variable voltage dividing resistor 32 to obtain a reference signal 31 by voltage dividing the output of this amplifier.

The comparator 20 includes a differential amplifier 34 where the signal G is fed as one input through an input resistor 33*a* and the reference signal 31 is supplied as the other input through a resistor 33*b*, and an inverter 35 for generating an inverted output L*r* by inverting the output L (FIG. 2B) of the differential amplifier 34. When the voltage of the signal G is larger than the reference signal 31, the differential amplifier 34 generates a negative voltage (see FIG. 2B–L).

A shift register 36 consisting of flip-flop circuits $F_1$ ... $F_8$ is provided. Each flip-flop circuit has its input terminals J*t*, K*t* and output terminals Q, $\overline{Q}$ connected as shown. The output L*r* of aforementioned inverter is given to the input terminal J*t* of the first-stage flip-flop circuit $F_1$ and also to the input terminal K*t* through an inverter 37. The output J of the clock pulse generator 26 is fed to the clock terminal CP of each flip-flop circuit. The outputs from the Q terminal of the flip-flop circuit $F_1$, $\overline{Q}$ terminal of $F_2$, $\overline{Q}$ terminal of FIG. 3, and Q terminal of $F_4$ are given as the inputs to the AND circuit 38. When the head signal 1001 is delivered from the comparator 20 to the input terminal of the shift register 36, an output signal M (FIG. 2B) is generated from the AND circuit. A set pulse generator 39 is formed where the output J of the clock pulse generator 26 is fed as one input and the output of the AND circuit 38 is supplied as the other input. When the output signal M is given, the set pulse generator 39 generates a set pulse N (FIG. 2B) after the clock pulse J has been counted eight times. This set pulse N delivers as outputs in parallel the bits $d_1$ to $d_4$ stored in a data memory 40 described below.

The outputs from the Q terminals of flip-flops ($F_1$, $F_2$), ($F_3$, $F_4$), ($F_5$, $F_6$) and ($F_7$, $F_8$) are fed to the input terminals of the AND circuits 41*a*, 41*b*, 41*c*, 41*d*, respectively. The output from the comparator 20 corresponding to the reference level signal (an amplitude unmodulated cycle) for the period of time Y of FIG. 1B is normally 1 (hereinafter called a reference output). If the modulated wave for the period of time Y contains data consisting of the 0101, the output from the comparator 20, including the reference output, will become 10111011. Therefore, the inputs of the AND circuit 41*d* are 1 and 0 and its output is 0; the inputs of the AND circuit 41*c* are 1 and 1 and its output is 1; the inputs of the AND circuit 41*b* are 1 and 0 and its output is 0; and the inputs of the AND circuit 41*a* are 1 and 1 and its output is 1. Thus the data memory 33K stores 0101. This data, after the head signal 1001 is detected as described above, is delivered as an output by the set pulse N.

Another embodiment for the further decrease of errors in the reproduced digital data is shown in FIG. 3A. In the embodiment shown in FIG. 2A, the digital data was reproduced by using a reference signal 31 (provisionally called a positive reference signal) from the voltage (FIG. 2B) obtained by rectifying the peak value of the positive half-wave of the signal G (FIG. 2B).

However, errors in the reproduced data can be reduced by reproducing the digital data in combination with another reference signal (tentatively called a negative reference signal) which can be obtained by using the peak value of a negative half-wave of the signal G. The portions at which the waveforms shown in FIG. 3B are obtained are designated by the same reference numerals in FIG. 3A. Like reference numerals in FIGS. 2A and 2B denote like parts or waveforms in FIGS. 3A and 3B and the detailed description is omitted here for the sake of brevity. If reference numerals 20 and 21 denote the first comparator and the first reference signal formation circuit, respectively, a second comparator 20' and a second reference signal formation circuit 21' are formed in addition. Throughout the first and second comparators 20 and 20', the same reference numerals designate the same parts, except for their outputs L and L' that are different from each other. It is also the case with the first and second reference signal formation circuits 21 and 21', except that the polarity of the diode 27 connected to the output terminal of the amplifier 17 is reversed. Accordingly, the input to the amplifier 30 of the second reference signal formation circuit 21' (FIG. 3B) is of the negative polarity and the waveform of the second reference signal 31' is different from that of the first reference 31. The clock pulse generator **26*a* is constructed such that the output H from the zero cross detected circuit is fed thereto to generate a clock pulse J and a clock pulse Ja the phase of which is by half period out of with respect to the clock pulse J. In addition, a flip-flop circuit $F_9$ is formed in which the output (inverted output of L') from the second comparator 20'** is fed to the terminal K*t;* the output obtained by inverting the output of the second comparator 20' by an inverter 43 is supplied to the terminal J*t;* and a clock pulse J*a* is fed to the terminal CP. The signal P shown in FIG. 3B can be derived from the terminal Q of the flip-flop circuit $F_9$. In addition, an AND circuit 44 is provided to be supplied with the output (inverted output of L) from the first comparator 20 and the output P from the flip-flop circuit $F_9$. Accordingly, a pulse 45 can be obtained as the output of the AND gate 44, showing that the outputs L and L' contain the corresponding information pulses. An extraction circuit 46 extracts the digital data signal as described in FIG. 2A. According to this embodiment, reproduction of the digital data signal without errors is possible even when there are included noises in the modulated carrier wave G.

In the reference signal formation circuits shown in FIGS. 2A and 3A, the positive and negative peak values of the signal G were respectively rectified through the diode 27. However, the capacitor 28 is not always charged each time the input signal becomes 1, that is, whenever an amplitude unmodulated cycle arrives. The capacitor 28 is first charged by an input signal representing 1 and discharged through the resistor 29. The capacitor 28 is charged only when the next 1 input signal is supplied and the interterminal voltage of the capacitor is higher than the amplitude of the next 1 input signal. Hence there is the tendency to cause an error in comparison between the reference level obtained from a 1 input signal within a block and the amplitude of a modulated cycle within the same block. FIG. 4A shows a reproduction circuit including a reference signal formation circuit which is capable of eliminating such error. The reference level forming circuit 21 shown in FIG. 4A is featured by inserting a field effect transistor 47 instead of the diode 27 of the reference signal formation circuit shown in FIG. 2A and by charging the capacitor 28 without fail whenever the 1 signal arrives to the circuit by being supplied with a signal from a switching element 48. In FIGS. 4A and 4B, the clock pulse generator **26*b*** produces by being fed an input signal H a clock pulse J and a clock pulse J*b* in somewhat phase lag relative to the pulse J. On the other hand, the output (i.e., inverted output of L in FIG. 4B) from the comparator 20 is fed to the terminal K*t* of a flip-flop circuit $F_{10}$ and the output of the comparator 20 to the terminal J*t* thereof through the inverter 43. An output P' from the Q terminal of the flip-flop circuit $F_{10}$ (FIG. 4B) and the clock pulse Jb are fed as inputs to an AND circuit 49. The switching circuit 48 is actuated by the output S of the AND circuit 49 to open the gate of the transistor 47. As apparent from FIG. 4B, the signal S is generated at a point of time delayed by the lagging angle of the clock pulse T*b* with respect to a time point in which the unmodulated cycle of the signal G has its maximum amplitude. Therefore, the capacitor 28 is unfailingly charged each time the amplitude-unmodulated cycle arrives.

Figure 5A:
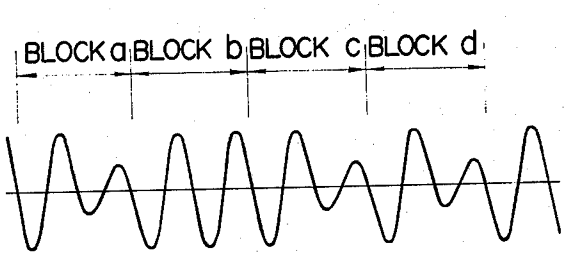
Figure 5B:
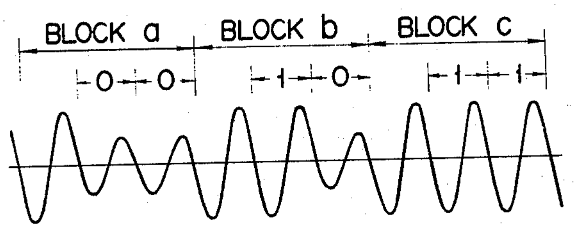
Figure 5C:
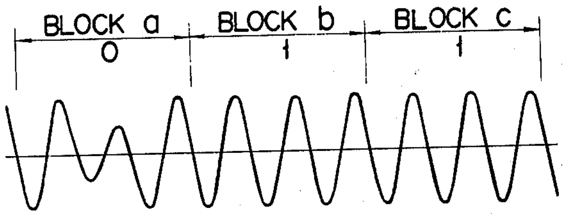
Figure 5D:
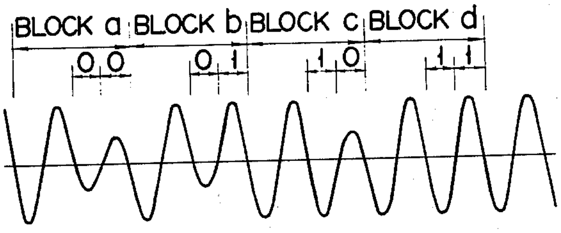

As shown in FIG. 5A, in the above-mentioned embodiments each block was defined to include two cycles therein and only one cycle of them was modulated by one bit. However, as shown in FIG. 5B, each block may be defined so as to contain three cycles, in which each of two cycles may be modulated by one bit. Further as shown in FIG. 5C, each block may contain three cycles therein where only the center cycle is modulated by one bit. Still further, as shown in FIG. 5D, each block may contain two cycles, the negative and positive halfwaves of one cycle of them being modulated by one bit respectively. The demodulation circuits may be modified according to their respective modulating systems.

The system of this invention is not limited to the embodiments described above.

What we claim is:

1. Data transmission system utilizing modulation of alternate carrier wave cycles comprising:

means for modulating said carrier wave so that said carrier wave is defined into a plurality of blocks and all the cycles but one at least within each of said blocks are subjected to amplitude modulation by a data signal;

means for recording or transmitting said modulated wave;

means for demodulating said modulated wave comprising means for comparing the amplitude of said unmodulated cycle of said recorded or transmitted wave with the amplitude of said modulated cycle in the same block and means for reproducing said data from the output of said comparing means;

said modulating means comprising means for generating a first square wave having a width equivalent to multiples of one cycle of said carrier wave;

means for feeding a head formation signal;

means for storing said data signal for modulating said carrier wave in a first data memory;

a ring counter supplied with said head formation signal and said first square wave to produce sequentially a plurality of second square waves defining said blocks; and gating means supplied with said head formation signal, said data signal stored in said first data memory, said first square wave and said second square wave to modulate said carrier wave by said head formation signal and said data signal.

2. Data transmission system according to claim 1 wherein said demodulating means comprises:

a zero cross detector for generating a zero cross signal by detecting the zero cross position of said modulated wave;

a clock pulse generator for producing a clock pulse in synchronism with said zero cross signal;

a shift register having a plurality of stages which is supplied with the output from said comparing means and shifts its contents by the clock pulse from said clock pulse generator; and gating means connected to each stage of said shift register to reproduce said data signal.

3. Data transmission system according to claim 2 wherein said demodulating means further includes:

a second data memory for storing said reproduced data signal;

an AND gate which is supplied with said head signal from the specified stages of said shift register; and a set pulse generator which is supplied with said clock pulse and the output of said AND gate and emits a set pulse to said second data memory for delivering in parallel said data stored therein.

4. Data transmission system according to claim 1 wherein said demodulating means comprising:

a zero cross detector for producing a zero cross signal by detecting the zero cross position of said modulated wave;

a clock pulse generator which is supplied with the zero cross signal and generates first and second clock pulses different in phases from each other;

a first reference signal formation circuit for forming a first reference signal having a level corresponding to the positive amplitude of said unmodulated cycle of said modulated wave;

a second reference signal formation circuit for forming a second reference signal having a level corresponding to the negative amplitude of said unmodulated cycle of said modulated wave;

a first comparator for comparing the positive amplitude of said modulated cycle with said first reference signal level to produce a first data signal included in said modulated wave;

a second comparator for comparing the negative amplitude of said modulated cycle with said second signal level to produce a second data signal included in said modulated wave;

an AND circuit for generating one pulse output each time the presence of a pair of corresponding pulses is detected from trains of pulses including said first and second data signals; and a data extraction circuit which is supplied with said output pulse from said AND circuit and with said first clock pulse to extract said data signal from the output of said AND circuit.

5. Data transmission system according to claim 1 wherein said demodulating means comprises a circuit for obtaining a reference signal at a level corresponding to the amplitude of said unmodulated cycle in each of said blocks of said modulated wave, said circuit comprising:

a field effect transistor with said modulated wave fed to the source electrode thereof and with a capacitor connected in series to the drain electrode thereof;

a switching circuit turned ON at a prescribed position close to the maximum amplitude of said unmodulated cycle within a block of said modulated wave to supply a gate-on signal to said field effect transistor for charging the capacitor with the substantial maximum amplitude; and a circuit for forming said reference signal from the interterminal voltage of said capacitor.

* * * * *